US009182010B2

(12) United States Patent
Yokoyama

(10) Patent No.: US 9,182,010 B2
(45) Date of Patent: Nov. 10, 2015

(54) CHAIN AND CONNECTING PIN

(71) Applicant: TSUBAKIMOTO CHAIN CO., Osaka-shi, Osaka (JP)

(72) Inventor: Masanori Yokoyama, Osaka (JP)

(73) Assignee: TSUBAKIMOTO CHAIN CO., Osaka-shi (JP)

( * ) Notice: Subject to any disclaimer, the term of this patent is extended or adjusted under 35 U.S.C. 154(b) by 0 days.

(21) Appl. No.: 14/284,443

(22) Filed: May 22, 2014

(65) Prior Publication Data

US 2014/0357440 A1    Dec. 4, 2014

(30) Foreign Application Priority Data

Jun. 3, 2013  (JP) .................................. 2013-117091

(51) Int. Cl.
*F16G 13/02* (2006.01)
*F16G 13/06* (2006.01)

(52) U.S. Cl.
CPC ...................................... *F16G 13/06* (2013.01)

(58) Field of Classification Search
CPC ......... F16G 13/06; B21L 9/065; A01D 17/10; A01D 2017/103; B65G 17/38
USPC .......................................................... 474/206
See application file for complete search history.

(56) References Cited

U.S. PATENT DOCUMENTS

| 552,899 | A | * | 1/1896 | Dunlop, Sr. .................... 474/230 |
| 3,099,346 | A | * | 7/1963 | Maas ............................. 198/733 |
| 3,192,785 | A | * | 7/1965 | Pearson ......................... 474/228 |
| 3,290,859 | A | * | 12/1966 | Talbot .............................. 53/534 |
| 3,321,907 | A | * | 5/1967 | Dewing et al. ....................... 59/8 |
| 4,493,680 | A | * | 1/1985 | Hoffmann ..................... 474/230 |
| 4,610,647 | A | * | 9/1986 | Weeds .......................... 474/206 |
| 4,655,733 | A | * | 4/1987 | Jonason ........................ 474/242 |
| 4,869,466 | A | * | 9/1989 | Isenhart ........................ 254/394 |
| 4,998,907 | A | * | 3/1991 | Sawada et al. ................ 474/206 |
| 5,305,594 | A | * | 4/1994 | Wang ................................ 59/85 |
| 5,400,585 | A | * | 3/1995 | Wang ................................ 59/85 |
| 6,855,080 | B2 | * | 2/2005 | Kanehira et al. .............. 474/231 |
| 7,216,472 | B1 | * | 5/2007 | Wang ................................. 59/7 |
| 7,427,251 | B2 | * | 9/2008 | Reiter et al. ................... 474/231 |
| 7,568,334 | B2 | * | 8/2009 | Fujiwara et al. .................... 59/5 |
| 2002/0173392 | A1 | * | 11/2002 | Doi et al. ....................... 474/209 |
| 2002/0173395 | A1 | * | 11/2002 | Reiter et al. .................. 474/231 |
| 2013/0053194 | A1 | | 2/2013 | Yokoyama |

FOREIGN PATENT DOCUMENTS

JP          2013-44386 A       3/2013

* cited by examiner

*Primary Examiner* — Henry Liu
(74) *Attorney, Agent, or Firm* — Westerman, Hattori, Daniels & Adrian, LLP

(57) ABSTRACT

Provided are a chain and a connecting pin that enable reduction in the number of components and the workload involved in chain assembly, and that enhances the strength of a connecting pin. A chain 100 has inner plates 110, outer plates 120 and connecting pins 130. Each connecting pin 130 has a pair of outer shaft sections 131 formed on both end sides of the pin and fixed into pin holes 121 of the outer plates 120; a pair of inner shaft sections 132 formed inward of the pair of outer shaft sections 131 in the pin longitudinal direction and freely fitted into pin holes 111 of the inner plates 110; and a movement restricting section 133 formed inward of the left-right pair of inner shaft sections 132 in the pin longitudinal direction and restricting the movement of the inner plates 110 in the chain width inward direction.

3 Claims, 5 Drawing Sheets

CHAIN AND CONNECTING PIN

BACKGROUND OF THE INVENTION

1. Field of the Invention

The present invention relates to a chain that has inner plates, outer plates and connecting pins, and to a connecting pin that is assembled into the chain.

2. Description of the Related Art

Bushless roller chains are conventionally known in which pairs of outer plates, and pairs of inner plates disposed between the pairs of outer plates, are connected by connecting pins that directly support the pairs of inner plates in such a manner that the latter can pivot, and that directly support rollers disposed between the pairs of inner plates in such a manner that the rollers can rotate, and so that, as a result, the pairs of outer plates and the pairs of inner plates are alternately chained with one another, in the chain running direction (for instance, Japanese Patent Application Publication No. 2013-44386).

In this bushless roller chain, the connecting pins are fixed to the outer plates, and are inserted, in a freely fitted state, into pin holes that are provided in the inner plates.

SUMMARY OF THE INVENTION

In conventional bushless roller chains, the movement of the inner plates in the chain width inward direction is restricted by the rollers. However, arranging the rollers entails resorting to a greater number of components, which is problematic. During chain assembly, moreover, a process is required whereby each connecting pin is fixed to one outer plate, the inner plate is freely fitted to the connecting pin, and thereafter, the roller is fitted into the connecting pin. The operation is accordingly complex and the workload involved in chain assembly significant, which is likewise problematic.

In conventional bushless roller chains, a given gap must be provided between the rollers and the connecting pins in order to secure smooth roller rotation. This is problematic in that, accordingly, the magnitude of the diameter of the connecting pins is limited, and it is difficult to increase the strength of the connecting pins.

Accordingly, it is an object of the present invention, which solves the above problems, to provide a chain and a connecting pin that afford reductions in the number of components and in the workload involved in chain assembly, and that afford, moreover, a yet stronger connecting pin.

The present invention solves the above problem by virtue of a chain that comprises a left-right pair of inner plates; a left-right pair of outer plates that are respectively disposed on outer side faces of the left-right pair of inner plates in a chain width direction; and a front-rear pair of connecting pins, with the left-right pair of inner plates and the left-right pair of outer plates being pivotally coupled by means of the connecting pins in the chain longitudinal direction, wherein each of connecting pins has: a pair of outer shaft sections formed on both end sides of the pin and fixed into pin holes of the outer plates; a pair of inner shaft sections formed inward of the pair of outer shaft sections in a pin longitudinal direction, and freely fitted into pin holes of the inner plates; and a movement restricting section formed inward of the left-right pair of inner shaft sections in the pin longitudinal direction and restricting the movement of the inner plates in the chain width inward direction.

In one aspect of the present invention, each connecting pin has a movement restricting section that restricts the movement of the inner plates in the chain width inward direction. As a result, it becomes possible to restrict the movement of the inner plates in the chain width inward direction, without fitting of rollers to the outer periphery of the connecting pins. This allows reducing the number of components while maintaining the inner plates at appropriate positions, and allows reducing the workload involved in chain assembly, since there is no longer a need for a process of fitting rollers to the outer periphery of the connecting pins during chain assembly.

In conventional bushless roller chains, a given gap must be provided between the rollers and the connecting pins, in order to secure smooth roller rotation. In the present invention, however, such gap need not be provided. Accordingly, it becomes possible to increase the diameter of the connecting pins and to enhance the strength of the connecting pins.

The shapes of the outer plates and the inner plates are identical to those of other kinds of roller chains and bush chains, and thus the design of the outer plates and of the inner plates need not be changed even if the type of chain is modified. The costs and workload involved in production of the chain can be reduced as a result.

Further, the portion between the inner plates and the connecting pins is in a freely fitted state. Accordingly, this allows avoiding the occurrence of stress between the inner plates and the connecting pins when the chain is not being used, and to prevent drops in chain strength.

In another aspect of the present invention, sprocket meshing sections formed to a larger diameter than that of the inner shaft sections can be used as movement restricting sections that restrict the movement of the inner plates in the chain width direction. As a result, no movement restricting sections need be formed separately from the sprocket meshing sections, and, accordingly, pin shape can be simplified, and manufacturing load reduced.

In another aspect of the present invention, the thickness of the inner plates in the chain width direction is set to be smaller than a spacing, in the chain width direction, between the outer plates and the movement restricting sections. As a result, gaps are formed between the inner faces of the outer plates and the outer faces of the inner plates, or between the inner plates and the movement restricting sections of the connecting pins. An oil film can be formed therefore between the inner faces of the outer plates and the outer faces of the inner plates or between the inner plates and the movement restricting sections of the connecting pins, and a lubricant can be supplied, through those gaps, between the pin holes of the inner plates and the inner shaft sections of the connecting pins, whereby chain wear can be accordingly curtailed.

In another aspect of the present invention, the connecting pins have hollow sections formed from one end to the other end in the pin longitudinal direction; this allows reducing not only the volume of the connecting pin, and accordingly material costs and chain weight, but also allows the connecting pins to be fixed to the outer plates, during chain assembly, through knocking of the inner peripheral side of the hollow sections at the end sections of the connecting pins, in such a manner that the end sections of the connecting pins widen from the inner peripheral side towards the outer peripheral side. It becomes possible as a result to reduce the extent by which the end sections of the connecting pins protrude beyond the outer faces of the outer plates.

DESCRIPTION OF THE PREFERRED EMBODIMENTS

The present invention may adopt any specific configuration, so long as the invention is a chain that has a left-right pair of inner plates, a left-right pair of outer plates that are respectively disposed on inner side faces of the left-right pair of inner plates, in the chain width direction, and a front-rear pair of connecting pins, with the left-right pair of inner plates and the left-right pair of outer plates being pivotally coupled by means of the connecting pins in the chain longitudinal direction, wherein each of connecting pins has: a pair of outer shaft sections formed on both end sides of the pin and fixed into pin holes of the outer plates; a pair of inner shaft sections formed inward of the pair of outer shaft sections in a pin longitudinal direction and freely fitted into pin holes of the inner plates; and a movement restricting section formed inward of the left-right pair of inner shaft sections in the pin longitudinal direction, and restricting the movement of the inner plates in the chain width inward direction, so that number of components and workload involved in chain assembly are both reduced, and the strength of the connecting pins is enhanced.

In the embodiments described below, a configuration is explained wherein, for instance, movement restricting sections that restrict the movement of the inner plates in the chain width inward direction are sprocket meshing sections having a larger diameter than that of the inner shaft sections of the connecting pins. However, the specific configuration of the movement restricting sections is not limited thereto, and the movement restricting sections may be configured, for instance, out of protrusions that are formed on the outer peripheral face of the connecting pins. In the embodiments described below, an instance is explained wherein the connecting pins have hollow sections, but the connecting pins may be formed as solid connecting pins.

Working Examples

A chain 100, being an embodiment of the present invention, will be explained next with reference to accompanying drawings.

Figure 1:
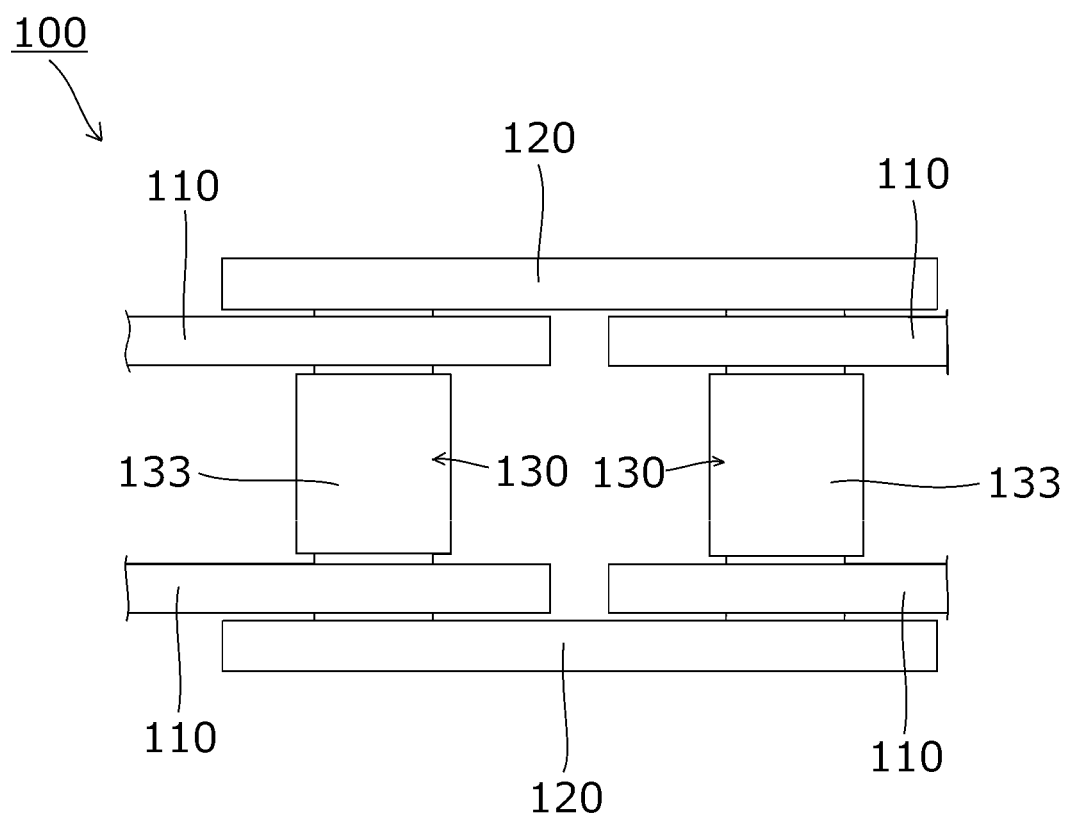
FIG. 1 is a plan-view diagram illustrating a chain being one embodiment of the present invention.
Figure 2:
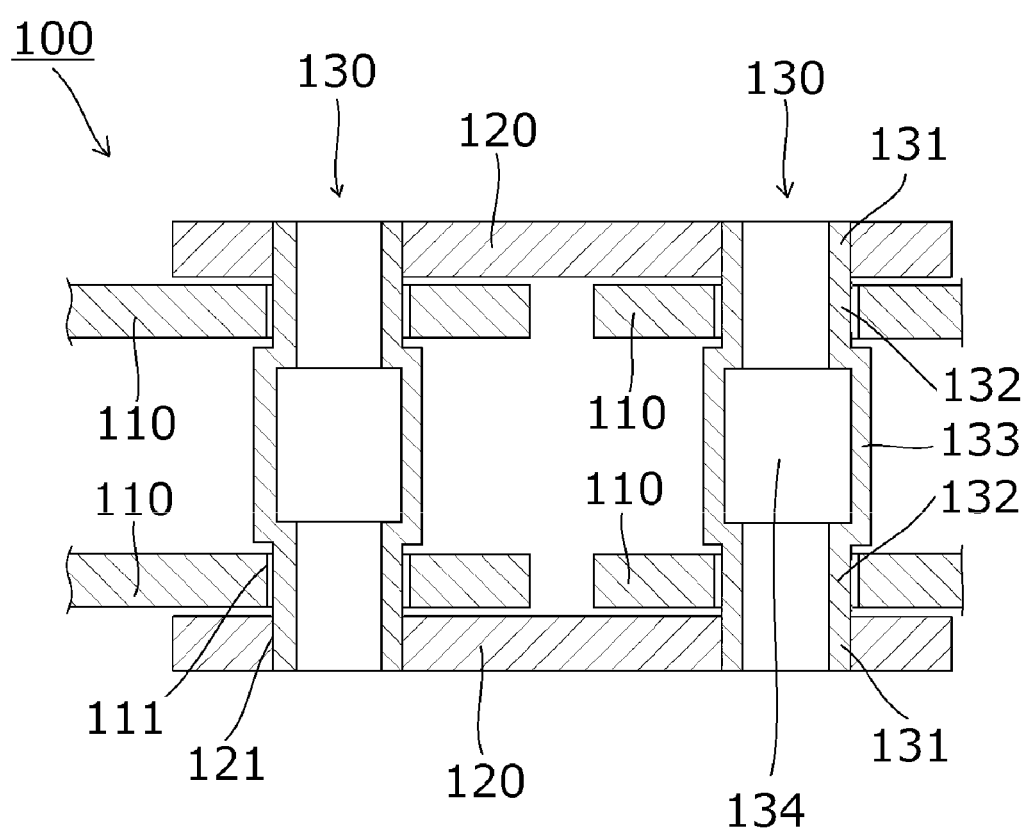
FIG. 2 is a cross-sectional diagram of the chain illustrated in FIG. 1.

As illustrated in FIG. 1 and FIG. 2, the chain 100 comprises a left-right pair of inner plates 110, a left-right pair of outer plates 120 respectively disposed outward of the left-right pair of inner plates 110, in the chain width direction, and a front-rear pair of connecting pins 130. The chain 100 is formed by pivotally coupling the left-right pair of inner plates 110 and the left-right pair of outer plates 120 in the chain longitudinal direction by means of the connecting pins 130.

As illustrated in FIG. 2, the inner plates 110 have a front-rear pair of pin holes 111. As illustrated in FIG. 2, the outer plates 120 have a front-rear pair of pin holes 121.

Figure 3:
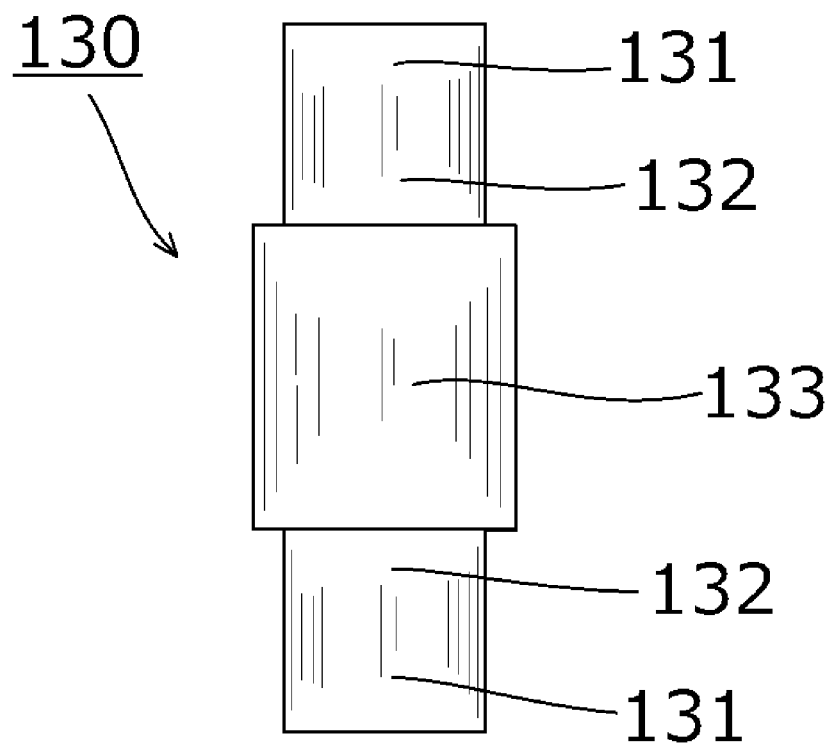
FIG. 3 is a plan-view diagram of a connecting pin that makes up the chain illustrated in FIG. 1.

As illustrated in FIG. 2 and FIG. 3, each connecting pin 130 has: a pair of outer shaft sections 131, formed on both end sides, and fixed by being press-fitted into the pin holes 121 of the outer plates 120; a pair of inner shaft sections 132, formed inward of the pair of outer shaft sections 131 in the pin longitudinal direction, and freely fitted into the pin holes 111 of the inner plates 110; and a sprocket meshing section 133, as a movement restricting section, formed inward of the left-right pair of inner shaft sections 132, in the pin longitudinal direction, and that restricts the movement of the inner plates 110 in the chain width inward direction.

The sprocket meshing sections 133 are sites for meshing with a sprocket (not shown), and are formed to a larger diameter than that of the inner shaft sections 132, as illustrated in FIG. 2 and FIG. 3.

Figure 5:
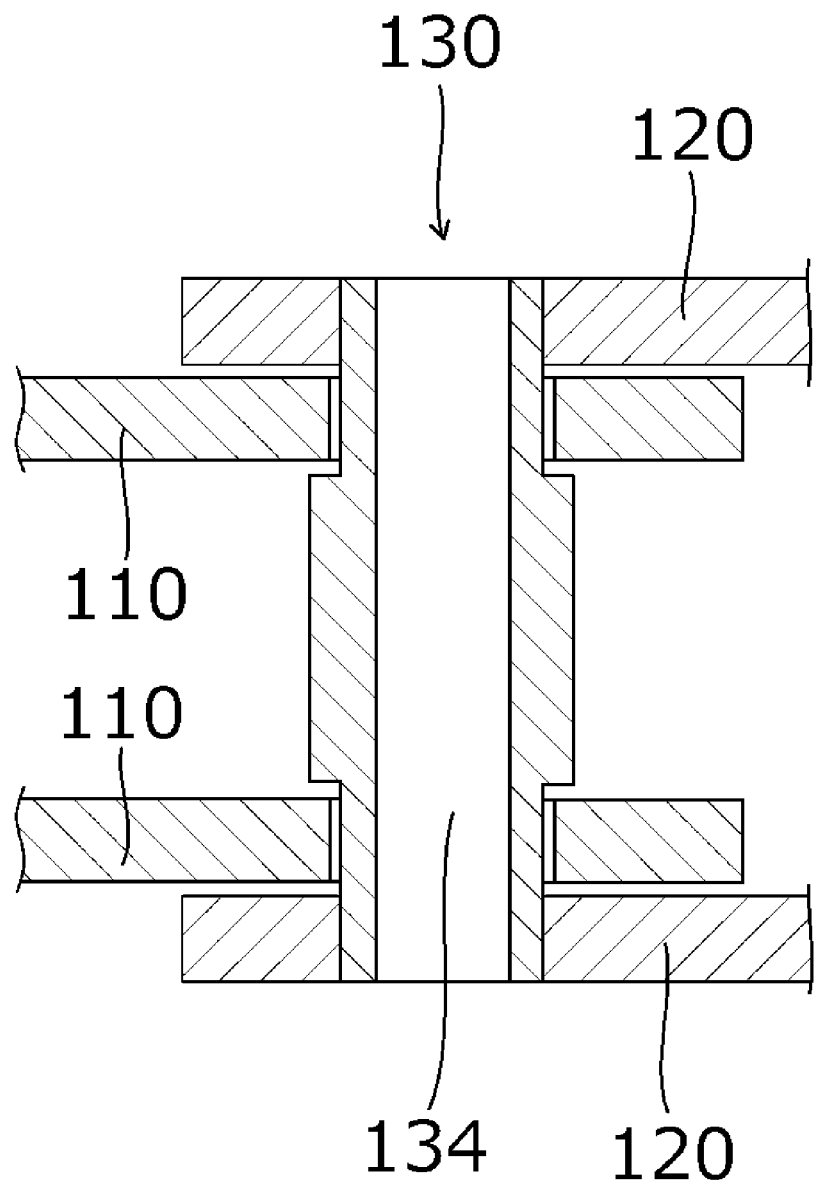
FIG. 5 is a cross-sectional diagram illustrating a variation of a connecting pin.

As illustrated in FIG. 2, the connecting pins 130 have respective hollow sections 134 that run through the connecting pins, from one end to the other end in the pin longitudinal direction. In the present embodiment, as illustrated in FIG. 2, the central section of the hollow sections 134 corresponding to the sprocket meshing sections 133 is formed to a larger diameter than that at both ends of the hollow sections 134 corresponding to the outer shaft sections 131 and the inner shaft sections 132. However, the shape of the hollow sections 134 is not limited thereto, and the hollow sections 134 may be formed to have the same diameter from one end up to the other end in the pin longitudinal direction, as illustrated in, for instance, FIG. 5.

Conceivable manufacturing methods of the connecting pins 130 include, for instance, welding, sintering, insert molding and the like. If the hollow sections 134 are to be formed in the connecting pins 130, the latter may be manufactured by curling a plate-like material to cylindrical shape using a molding machine or the like.

As illustrated in FIG. 2, the thickness of the inner plates 110 in the chain width direction is set to be smaller than the spacing, in the chain width direction, between the outer plates 120 and the sprocket meshing sections 133.

Figure 4:
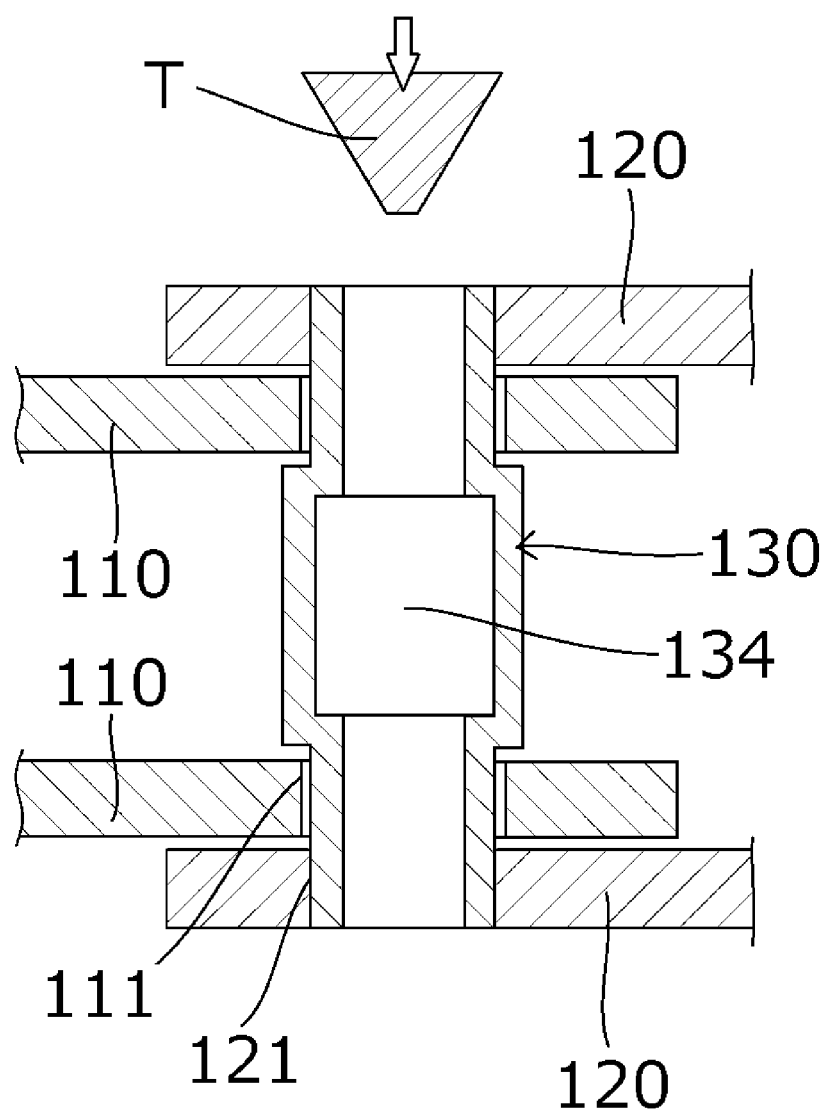
FIG. 4 is an explanatory diagram illustrating an example of a method for fixing a connecting pin to outer plates.

The connecting pins 130 have the hollow sections 134 that run through the connecting pins 130 from one end to the other end, in the pin longitudinal direction; this allows reducing not only the volume of the connecting pins 130, and accordingly material costs and chain weight, but also allows the connecting pins 130 to be fixed to the outer plates 120, during chain assembly, through knocking of the inner peripheral side of the hollow sections 134 at the end sections of the connecting pins 130, using a jig T, in such a manner that the end sections of the connecting pins 130 widen from the inner peripheral side towards the outer peripheral side, as illustrated in FIG. 4. It becomes possible as a result to reduce the extent by which the end sections of the connecting pins 130 protrude beyond the outer faces of the outer plates 120.

What is claimed is:

1. A chain comprising: a left-right pair of inner plates; a left-right pair of outer plates that are respectively disposed on outer faces of the left-right pair of inner plates in a chain width direction; and a front-rear pair of connecting pins, with the left-right pair of inner plates and the left-right pair of outer plates being pivotally coupled by means of the connecting pins in the chain longitudinal direction, wherein each of the connecting pins has:
a pair of outer shaft sections formed on both end sides of the pin and fixed into pin holes of the outer plates;
a pair of inner shaft sections formed inward of the pair of outer shaft sections in a pin longitudinal direction and freely fitted into pin holes of the inner plates; and
a movement restricting section, formed inward of the left-right pair of inner shaft sections in the pin longitudinal direction and restricting the movement of the inner plates in the chain width inward direction, wherein the movement restricting section is a sprocket meshing section having a larger diameter than that of the inner shaft sections, wherein each of the connecting pins have hollow section formed from one end to the other end thereof in the longitudinal direction thereof, and wherein the central section of the hollow section corresponding to the sprocket meshing section is formed to be of a diameter larger than that at both ends of the hollow section corresponding to the outer shaft sections and the inner shaft sections.

2. The chain according to claim 1, wherein the thickness of the inner plates in the chain width direction is set to be smaller than a spacing, in the chain width direction, between the outer plates and the movement restricting sections.

3. A connecting pin constituting a chain, comprising:

a pair of outer shaft sections formed on both end sides of the pin to be fixed into pin holes of outer plates;

a pair of inner shaft sections formed inward of the pair of outer shaft sections in a pin longitudinal direction to be freely fitted into pin holes of inner plates; and a movement restricting section formed inward of the left-right pair of inner shaft sections in the pin longitudinal direction and restricting the movement of the inner plates in the chain width inward direction, wherein the movement restricting section is a sprocket meshing section having a larger diameter than that of the inner shaft sections, wherein the connecting pin has a hollow section formed from one end to the other end of the connecting pin in the longitudinal direction, and wherein the central section of the hollow section corresponding to the sprocket meshing section is formed to be of a diameter larger than that at both ends of the hollow section corresponding to the outer shaft sections and the inner shaft sections.

\* \* \* \* \*